…

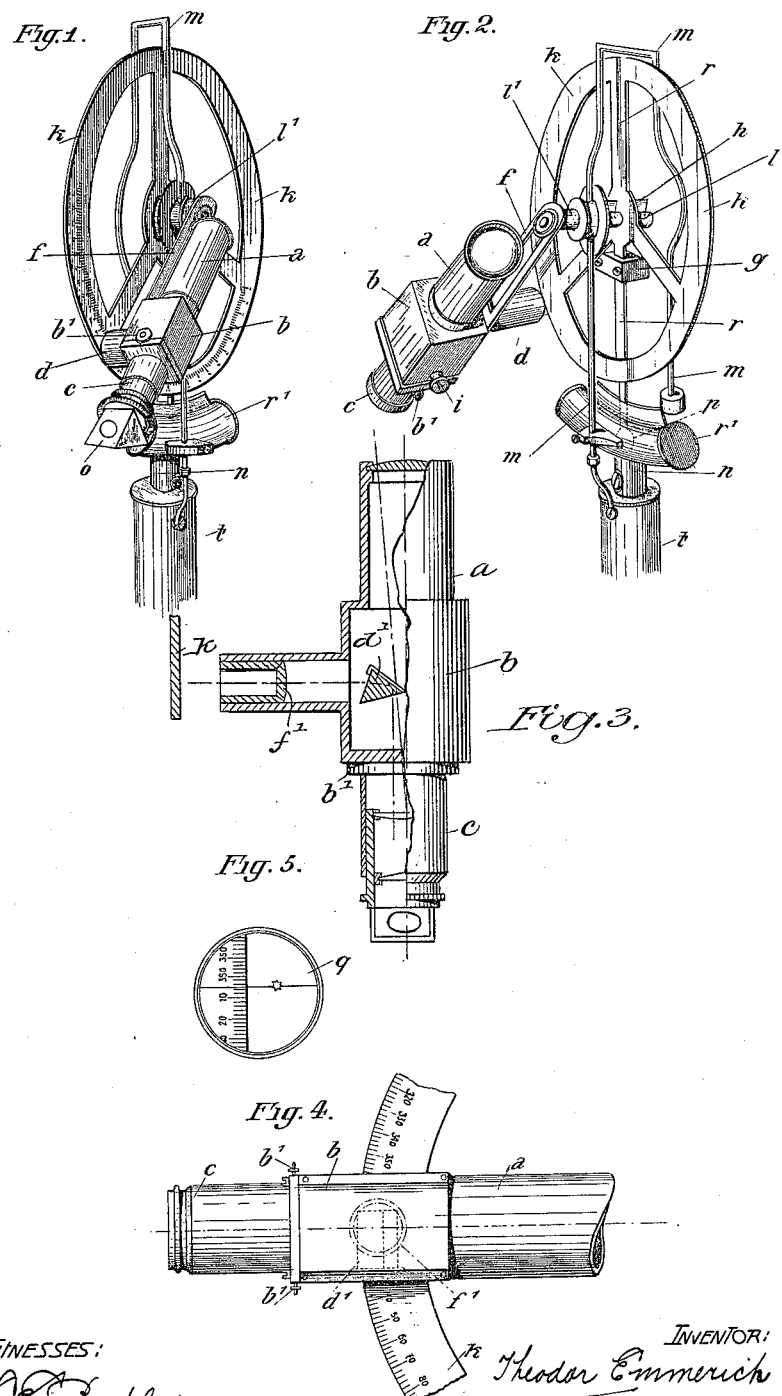

UNITED STATES PATENT OFFICE.

THEODOR EMMERICH BEYER, OF SEBASTOPOL, RUSSIA.

ALTITUDE INSTRUMENT.

1,151,336. Specification of Letters Patent. Patented Aug. 24, 1915.

Application filed December 18, 1911. Serial No. 666,619.

*To all whom it may concern:*

Be it known that I, THEODOR EMMERICH BEYER, mechanical instrument maker, a subject of the Empire of Russia, residing at 1, Dokowaja, Korabelnaja, Sebastopol, in the Empire of Russia, have invented certain new and useful Improvements in Altitude Instruments, of which the following is a specification.

The present invention has for its object the production of a hand altimeter of such character that the angle of elevation of an object can be read off directly by means of the same ocular or eyepiece through which the object is viewed.

Many instruments have been devised by means of which the angular elevation of a star above the horizon can be measured independently of the natural horizon. Examples of such instruments are Fleuviais's artificial horizon which can be attached to the sextant, Paget's leveling horizon, and that constructed by Professor Schwarzchild. The observer is however unable by means of any of these instruments to read off the observed angle at the time of observation and is obliged to read it off subsequently from the graduated scale of the instrument, a mode of procedure which is liable to a certain degree of inconvenience. It is moreover necessary that the instrument should be provided with a number of subsidiary appliances such as a vernier, micrometer, magnifying glass, and the like.

This complicated method of measurement is superseded by means of the instrument to which this invention relates, the said instrument possessing moreover the further advantage that it enables the altitude of an object to be read off in the ocular at the same time that the object is brought into the field of view, while on account of its great simplicity it can be used successfully not only for nautical and aeronautical but also for surveying purposes.

The apparatus comprises a vertical graduated circle, that is centrally mounted by means of a knife-edge and the zero-adjustment of which is effected by means of weights, while its oscillation is promptly checked by means of a damping device. Laterally to the graduated scale of the apparatus there is rotatably mounted on the axis of the circle a telescope which is provided with a microscope, and in the ocular of which, when the object is brought into the field of view the graduated scale is simultaneously brought into view beside the vertical wire of the cross-wires.

The accompanying drawings illustrate apparatus in accordance with this invention provided with a liquid damping device:—

Figures 1 and 2 being respectively views of the measuring instrument from the side of the ocular and of the objective, Figs. 3 and 4 respectively a top plan and a side elevation of the microscope-telescope, and Fig. 5 a representation of the field of view showing the object and scale.

By means of a steel knife-edge $h$ there is mounted upon a handle $t$ within a supporting frame $m$, so as to be capable of swinging freely, a circle $k$ that is provided on one side with a graduated scale, the arrangement being such that the downwardly directed knife-edge passes exactly across the center of the circle $k$ and has its bearing on the axial line of the shaft $l$, which is recessed, as is usual in the case of a scale-beam, so as to permit the knife-edge to oscillate freely. The center of gravity of the circle is located as nearly as possible below the axis thereof, a result that can be attained in a very simple manner by the adjustment of weight $g$ along the radii $r$ which lie opposite to each other above and beneath the center.

The circle $k$ is so graduated that when in its position of rest the zero lies exactly at the lowermost position of said circle. Since, when the instrument is in use, the graduated circle $k$ oscillates, there is arranged beneath it a damping device which prevents the amplitude of the oscillations from becoming too great and it facilitates the adjustment of the circle to the zero-position. The damping device has the form of a small disk $p$ (Fig. 2) attached to the circle by means of a wire and dipping into a curved tube $r'$ that is open at the top and is filled with a liquid, such as mercury, water, oil or the like. As the disk $p$ has the tendency to follow the oscillations of the circle $k$ it meets with resistance from the liquid in the tube $r'$ and it follows that the oscillations of the circle will soon cease, with the result that the circle will quickly resume its normal position, that is to say, it will always assume the same position relatively to the horizon.

Upon the shaft $l$ opposite to the graduated scale of the circle $k$ there is mounted by means of the sleeve $l'$ the support $f$ of the telescope, which consists of a perforated plate that is attached to the sleeve $l'$ in such manner that the telescope is parallel to the circle $k$ and can be tilted upward and downward.

From the side of the casing $b$ of the telescope there projects a tube $d$ which is brought opposite to the graduated scale of the circle $k$. In the tube $d$ there is mounted a lens $f'$ while in the casing $b$ of the telescope opposite the mouth of the tube an equilateral prism $d'$ is mounted in such manner as to be visible in the ocular at one side of the field of view. Between the casing $b$ and the ocular tube $c$ there are arranged in the well-known manner cross-wires that can be adjusted by means of the small screw $b'$. The objective tube is arranged laterally of the prism $d'$ in the telescope casing an arrangement from which it results that, while the rays of light from the objective fall directly on the ocular and the object appears in the field of view, the rays of light coming from the graduated scale through the tube $d$ are reflected by the prism $d'$ so that in the ocular tube they lie parallel with those coming from the objective, the graduated scale thus becoming visible in the field of view next to the object (Fig. 5).

The operation of the instrument is as follows: The handle $t$ is gripped with the left hand, the circle $k$ at first oscillating on its bearing in the manner of a balance but, under the action of the damping device $r'$, soon assumes its position of rest. The telescope can meanwhile be adjusted with the right hand to the sun or any known star, whereupon as soon as this is brought into the field of view of the telescope there will appear next to it the image of the graduated scale. By means of the cross-wire the altitude of the star can be read off at once from the graduated scale in a rapid, convenient and exact manner.

The circle $k$, with the damping device, especially when the damping device takes the form of a small bob, may also advantageously be used as a clinometer, or the like.

It is to be understood that while I have shown the graduated circle in a vertical position, this device is equally efficient in simultaneously observing an object and reading a scale, when applied to a horizontal circle for measuring horizontal angles.

What I claim as my invention is:

1. In a hand altimeter, a handle, a frame supported by the handle, a shaft supported by the frame, a weighted circular plate supported by the shaft and adapted to move thereon, a casing, means for connecting the casing to the shafts, an ocular tube extending from one end of the casing, and an objective tube extending from the opposite end thereof, said tubes being in communication with the interior of the casing, a tube extending from one side of the casing, one end of the tube being spaced from the circular plate, said tube adapted to receive the rays reflected by the circular plate, and a prism in the casing for projecting the rays of light from the circular plate through the ocular tube.

2. In a hand altimeter, a handle, a support extending above the handle, a shaft on the support, a weighted circular graduated plate mounted to oscillate on the shaft, a portion of said shaft extending beyond one side of the support, a casing supported by the extended portion of the shaft, said casing having an ocular and objective tube in communication with the interior thereof, a tube extending from one side of the casing, one end of said tube being spaced from the plate, a prism in the casing, said prism being in the line of vision through the ocular tube, said prism adapted to project the rays reflected from the plate through the ocular tube.

In testimony whereof I have affixed my signature in presence of two witnesses.

THEODOR EMMERICH BEYER.

Witnesses:
ALFRED W. SMITH,
HUNKMA NORBENS.

Copies of this patent may be obtained for five cents each, by addressing the "Commissioner of Patents, Washington, D. C."